June 28, 1966     T. G. HART     3,258,617
PIEZOELECTRIC DEVICE

Filed Feb. 7, 1963         4 Sheets-Sheet 1

THOMAS G. HART
*INVENTOR.*

BY Alden D. Redfield
Melvin E. Frederick
ATTORNEYS

June 28, 1966   T. G. HART   3,258,617
PIEZOELECTRIC DEVICE
Filed Feb. 7, 1963   4 Sheets-Sheet 3
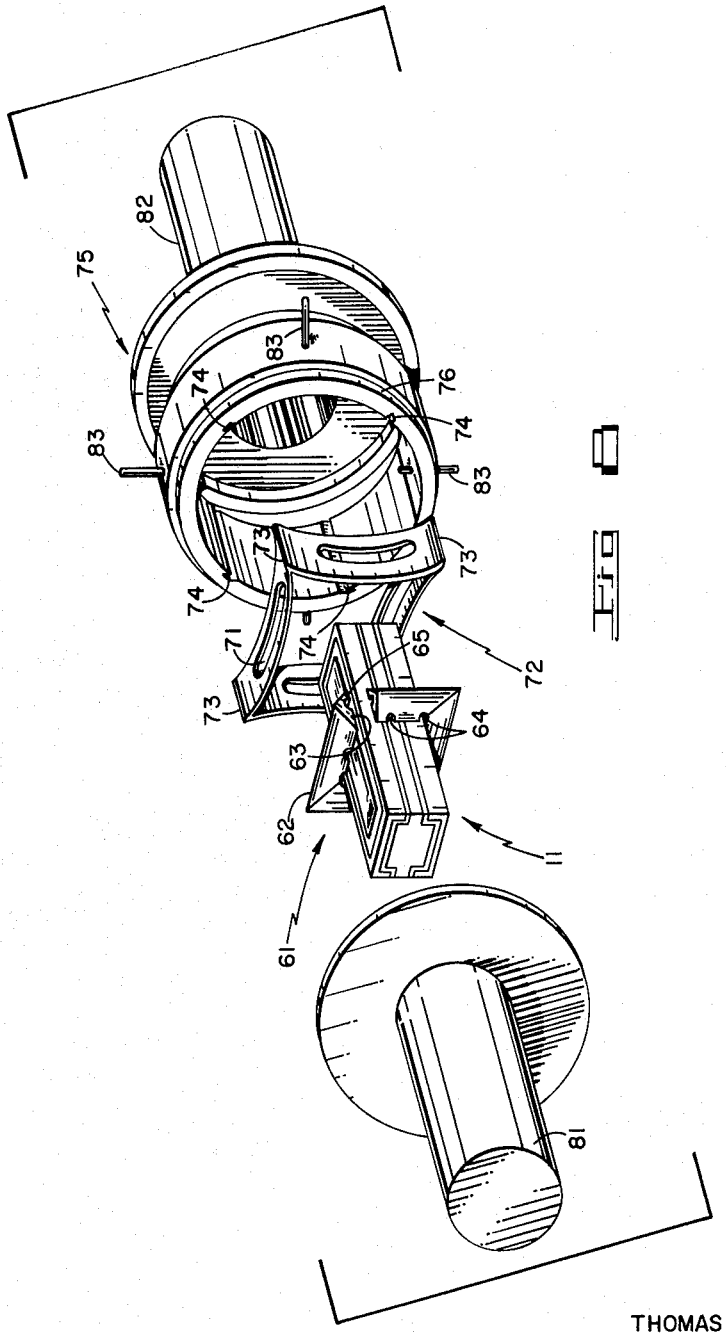
THOMAS G. HART
INVENTOR.
BY Alden D. Redfield
Melvin E. Frederick
ATTORNEYS June 28, 1966        T. G. HART        3,258,617
PIEZOELECTRIC DEVICE Filed Feb. 7, 1963        4 Sheets-Sheet 4

THOMAS G. HART
INVENTOR.

BY Alden D. Redfield
Melvin E. Frederick
ATTORNEYS

United States Patent Office 3,258,617
Patented June 28, 1966

3,258,617
PIEZOELECTRIC DEVICE
Thomas G. Hart, West Acton, Mass., assignor to Avco Corporation, Cincinnati, Ohio, a corporation of Delaware
Filed Feb. 7, 1963, Ser. No. 256,871
14 Claims. (Cl. 310—9.8)

The present invention relates to piezoelectric devices, and in particular, to piezoelectric resonance devices for detecting inertial rotation.

Any mechanical structure whatsoever may be caused to vibrate in a great number of different ways. In general, the manner in which a typical structure vibrates in response to a particular excitation depends upon the form of the excitation and upon the elastic, inertial, and geometrical properties of the structure. Once excited into vibration, a structure generally continues to vibrate after the excitation means is withdrawn; such self-sustaining vibration of a structure is commonly termed "resonant vibration." If a structure were completely unconstrained and free of internal frictional losses, a resonant vibration, once excited in the structure, would normally sustain itself indefinitely, being substantially influenced only by inertial rotation of the structure.

A structure in resonant vibration has two forms of mechanical energy due to the vibration—elastic energy and motional energy—and it is the recurrent conversion of energy from one form to the other, the total energy remaining constant, that sustains the resonance. The balance between the elastic and motional energies of a structure in resonant vibration is disturbed by rotation of the structure about an appropriate axis to the extent that during each vibrational cycle there is alternately too much and too little motional energy to properly account for the elastic energy. Accordingly, when a vibrating structure is rotated about an appropriate axis, redistribution of motional energy occurs within the structure so as to maintain an overall energy equilibrium. Generally, this rotation-induced redistribution of vibrational energy results in further vibrational movements; these further vibrational movements, present only when the structure is rotated about an appropriate axis, can, in certain circumstances, be isolated and used as a measure of the rotation. (The aforementioned further vibrational movements can be said to result from a change in state of the resonant vibration (standing wave) which is thereby detected and used as a meaesure of rotation rate.) The amount of energy in the rotation-induced vibration, in relation to the amount of energy in the original vibration, depends upon the rate of rotation, upon the relative direction of the rotational axis, and upon the vibrational properties of the structure. The phase of the rotation-induced vibration, in terms of its constituent energies, as compared to the phase of the original vibration, is reversed as the sense of rotation is reversed. Accordingly (as disclosed for example in my patent applications, Serial No. 770,507, filed October 29, 1958, and Serial No. 204,196, filed June 21, 1952, now Patent Number 3,141,100) a measure of the magnitude and relative phase of the rotation-induced vibration can be used as a measure of, respectively, the rate and sense of rotation of the structure.

A considerable amount of energy can be stored in resonant vibrational movements of a structure; hence, in a suitable structure in suitable resonant vibration, a considerable amount of energy may be redistributed by rotation of the structure about an appropriate axis, and, in accordance with the present invention, such a structure can form the basis, among other things, of a highly sensitive rotation-sensing device. However, sensitivity is but one of many characteristics desired of a practical rotation-sensing device; linearity, frequency response, insensitivity to linear acceleration, zero-point stability, temperature stability, and immunity to harsh environment are, for example, also important. Whereas a wide variety of types of structures, composed of different materials and vibrating in different ways, show possibility of high sensitivity as rotation sensors, only structures of suitable configuration, such as, for example, rectangular prismatic, composed of a stable low internal loss material, such as, for example, a piezoelectric crystalline material like crystal quartz or a piezoelectrically polycrystalline material like sintered barium-lead-calcium titanates, evidence capability of attaining a useful combination of desirable characteristics.

Piezoelectric resonance devices in accordance with the present invention will have a generally prismatic configuration and may be comprised of a monolithic piezoelectric member or of a multiple of piezoelectric members, but in either case will have certain features enumerated hereinafter.

Electrodes are provided on the surfaces of the member or members comprising the structure for piezoelectrically coupling energy into the structure so as to sustain a resonant vibration and for piezoelectrically coupling energy out of the structure, as, for example, may be released from the resonance energy by inertial rotation. As will become evident hereinafter, in the case of a multiple-member device, the surface or surfaces of the members provided with electrodes may be exterior and/or interior surfaces.

Broadly speaking, the choice, in some cases, singly, and in other cases, in combination, of size and shape of the member or members, orientation of the surfaces of the member or members with respect to the piezoelectric axis or axes, shape, size, and disposition of the electrodes on the surfaces of the member or memebers, and, in the case of a multiple-member device, relative piezoelectric orientation and polarity of the members with each other, determines the nature of the device.

It is a principal purpose of the present invention to provide piezoelectric devices of prismatic configuration, which may be of any suitable piezoelectric material, having a balance of desirable characteristics for rotation-sensing purposes.

It is another purpose of the present invention to provide crystal-quartz rotation sensing devices of prismatic configuration.

It is a further purpose of the present invention to avoid disadvantages of known apparatus for measuring inertial movement by the provision of piezoelectric devices characterized by light weight, small space and power requirements, and simplicity coupled with high reliability and accuracy.

The novel features that are characteristic of the invention are set forth in the appended claims; the invention itself, however, both as to its organization and method of operation, together with additional objects and advantages thereof, will best be understood from the following description of specific embodiments when read in conjunction with the accompanying drawings, in which:

FIGURE 8 is an exploded view with parts broken away illustrating typical mounting means for one type of device in accordance with the present invention;

FIGURE 9 shows a piezoelectric resonance device according to the present invention in conjunction with conventional electronic means, the combination serving to measure rate and sense of rotation.

Figure 1:
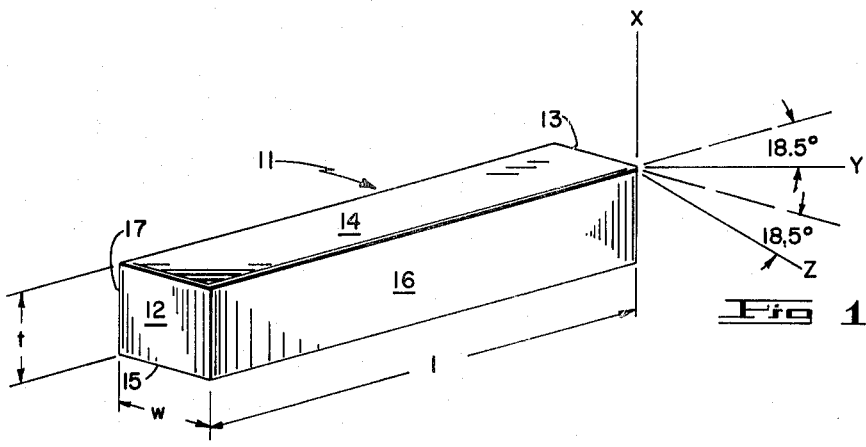
FIGURE 1 is a perspective view of a rectangular-prismatic block of crystal quartz having surfaces oriented with the crystal axes as shown therein.

Generally, if a structure is vibrating with the vibrational movements directed in one direction (i.e., the movements are directed normal to a single plane) and is rotated about an axis at right angles to that direction, then the further vibrational movements induced by rotation of the structure are substantially directed in a direction at right angles to both the direction of movement in the original vibration and to the axis of rotation. Accordingly, as more fully disclosed hereinafter, if two distinct sets of electrodes are provided on the surfaces of an appropriate piezoelectric structure and are responsive, respectively, only to movements directed in two mutually orthogonal directions—such two movements existing independently in the structure—then rotation of the structure about the third orthogonal direction, will, in effect, couple the otherwise uncoupled two sets of electrodes. Hence, one set of electrodes may be used to drive the structure into resonant vibrational movements directed along one direction, while the other set of electrodes may be used to detect the further vibrational movements, directed along the second direction, induced by rotation having a component about the third direction. Piezoelectric means or structure for purpose of measuring inertial rotation will therefore ideally have the following features:

(1) The structure will have a vibrational resonance wherein the vibrational movements are substantially directed in a single direction.

(2) The structure will be piezoelectrically responsive independently and conjointly to stresses directed respectively in each of two mutually orthogonal directions, one of which is a direction of resonant vibrational movements.

(3) The structure will be such as to allow two distinct sets of electrodes on its surfaces; the two sets of electrodes will be respectively associated with the two independently piezoelectrically responsive directions and will be coupled only by rotation.

(4) The structure will be amenable to rigid mounting without significant degradation of features 1, 2, and 3.

As used in the claims, "prismatic piezoelectric device" means a structure of prismatic shape (in the strict geometrical sense) composed of a piezoelectric material and "piezoelectrically responsive" in a particular direction means that a voltage gradient is produced somewhere within the device by stress acting within the device directed in that particular direction.

As is well known in the art, if varying voltage gradients are imposed across a piezoelectric device or, for example, by means of varying voltages applied to suitable electrodes disposed on the surfaces of the structure, varying stresses are set up within the structure by virtue of its piezoelectric nature. Conversely, if varying stresses are set up within the structure, voltages will appear at electrodes appropriately disposed on the surfaces of the structure. Generally, a piezoelectric structure is more responsive (in terms of stress gradient produced for a given voltage gradient or, conversely, in terms of voltage gradient produced for a given stress gradient) in some directions than in others. Hence, a complete description of the piezoelectric nature of a structure depends upon, among other things, the selection of piezoelectric responses relating to particular directions. For example, a rectangular-prismatic block of crystal quartz can, in a variety of ways, be dimensioned and orientated with respect to the crystal-quartz-axes so as to be piezoelectrically responsive, independently and conjointly to two stresses, which is to say vibrational movements, essentially directed at right angles to one another. In such a block, therefore either one of these modes of vibration can be excited and sustained in resonance in the block by means of suitable electrodes, while the other, being induced by rotation, can be detected by means of further suitable electrodes.

Attention is now directed to FIGURE 1 which shows, way of example, such a block. Referring to FIGURE 1, there is shown a crystal-quartz rectangular-prismatic block 11 having respectively rectangular end faces 12 and 13, rectangular major side faces 14 and 15, and rectangular minor side faces 16 and 17. The length, width and thickness directions of the block are designated by $l$, $w$, and $t$, respectively. The directions of the three crystal axes of block 11 are represented by axes X, Y, and Z. Thus, as illustrated in FIGURE 1, the crystal X axis, commonly termed the electric axis, is normal to the major side faces 14 and 15. The crystal Y axis, commonly termed the mechanical axis, is disposed at 18.5° to the end faces 12 and 13. The crystal Z axis, commonly termed the optic axis, being normal both to the X and Y axes, is disposed at 18.5° to the minor side faces 16 and 17. (As is now apparent, the term "orientation," when user herein, refers to the angular relationship between the member faces and the crystal axis. The orientation of a rectangular-prismatic block would accordingly be fully specified in terms of three angles that the three pairs of parallel faces make with the crystal axes.)

Figure 2:
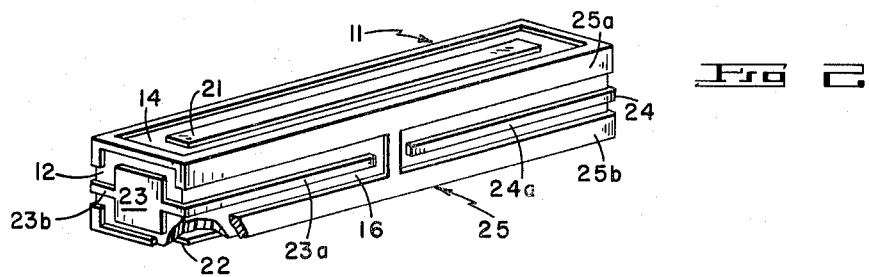
FIGURE 2 is a perspective view illustrating a typical electrode arrangement on the surfaces of the block of FIGURE 1.

Attention is now directed to FIGURE 2 which illustrates a typical electrode arrangement on the surfaces or faces of the block 11 of FIGURE 1. As shown in FIGURE 2, electrode 21 and electrode 22 (not fully visible) are disposed on, respectively, the major side faces 14 and 15 and are otherwise identical. The block 11 may be sustained, by suitable voltages applied to electrodes 21 and 22, in longitudinal resonance wherein the main vibrational movements are directed along the length direction of the block.

Electrode 23 and electrode 24 (not fully visible) are disposed respectively, on the end faces 12 and 13 and are otherwise identical. As shown in FIGURE 2, narrow extensions 23a, 23b, 24a, 24b of electrodes 23 and 24 extend outwardly at the center of the end faces in the width direction to the minor side faces and thence extend not quite half way along the minor side faces in the length direction. These extensions are provided merely to facilitate external electrical connections to the block, and their width is accordingly small compared to the thickness of the block. Electrode 25, which serves as a ground reference and to electrically isolate electrodes 21 and 22 from electrodes 23 and 24, is disposed around the edges of the block 11, spaced from and surrounding electrodes 21 and 22 and electrodes 23 and 24. The upper and lower portions 25a and 25b of the ground electrode 25 are connected at the minor side faces intermediate the extreme end portions of the extensions of electrodes 23 and 24. Shear vibrational movements directed in the thickness direction of the block induced by rotation of the block about an axis in the width direction, will cause voltages to appear at electrodes 23 and 24.

Accordingly, the ideal features enumerated earlier as required of a piezoelectric structure for the purpose of rotation-sensing are possessed by the structure of FIGURE 2 provided that:

(a) No alternating voltage appears between electrodes 23 and 24, due to vibration of the block in fundamental longitudinal resonance, as sustained by electrical energy supplied via electrodes 21 and 22, and (b) No alternating voltage appears between electrodes 21 and 22, due to the shear vibrational movement of the block in its thickness direction, induced by rotation of the block about an axis in the width direction.

These two requirements are fully met so long as the block 11 illustrated in FIGURE 2 is precisely rectangular-prismatic in shape, is precisely oriented as shown in FIGURE 1, and if the electrodes 21, 22, and 23, 24 are respectively in pairs principally identical in size, shape, and disposition, and if, further, the block is suitably mounted at its center, whereat movement due to both the longitudinal and the shear vibrations is at a minimum. For example, an error in orientation disposing the crystal X axis so as not to lie exactly normal to the major side faces of the block causes an alternating voltage to appear between detecting electrodes 23 and 24, even in the absence of rotation. This spurious voltage is of relatively constant magnitude independent of rotation rate and hence constitutes a "zero rotation error" of constant amount which may be compensated for by conventional electronic means. Such a spurious voltage, although compensable, is undesirable, since it leads to electronic circuit complexity. Further, for example, errors in the shape of the block and/or in the relative configuration and disposition of the electrodes also lead to spurious voltages between electrodes 23 and 24, similarly compensable by conventional electronic means but also leading to electronic circuit complexity.

The monolithic block of FIGURE 2 hence preferably requires, for purpose of rotation sensing, precise control of dimensions, shape and orientation of the block and precise control of dimensions, configuration and disposition of the electrodes. On the other hand, in accordance with the present invention, a block configuratively similar to the block shown in FIGURE 2 may be comprised of a plurality of individual members bonded together, such multiple-member construction alleviating to some extent the practical requirements for precise control of fabrication. Further, the multiple-member nature of such a structure allows disposition of electrodes inside the structure between abutting surfaces of the various members leading, in some cases, to simplification of the electronic circuits. Moreover, in such a multiple-member structure, an appropriate arrangement of member polarities with respect to one another can provide useful piezoelectric effects difficult or impossible to attain in a monolithic structure.

The above-noted features of a multiple-member structure, as compared to a monolithic structure, may be best understood by considering how a typical monolithic block may be subdivided and the parts then recombined and bonded together so as to yield a multiple-member structure of substantially the same shape, size, and mode of operation as the monolithic block.

Figure 3:
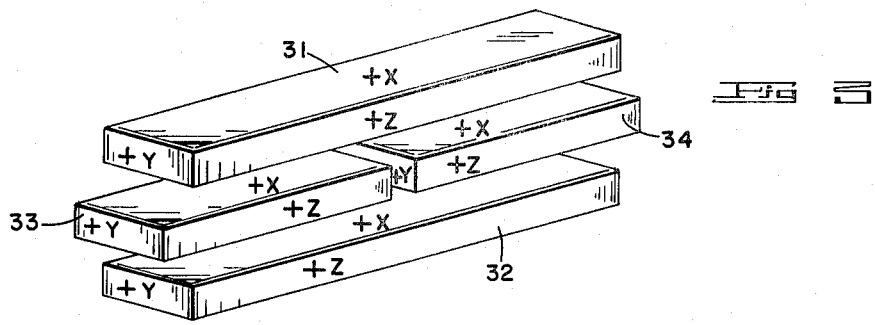
FIGURE 3 is an exploded view illustrating subdivision of the crystal-quartz block of FIGURE 1 preparatory to recombining the parts so as to alleviate requirements for precision in fabrication.

FIGURE 3 is an exploded view illustrating the crystal-quartz block 11 of FIGURE 1 subdivided into four members, 31, 32, 33, and 34. For purposes of comparative illustration, the assumption is made that the block of FIGURE 1 is subdivided precisely, without any loss of material due to cutting, into pieces having identical orientation, each piece having accurately parallel opposing surfaces. (In practice, such desirable features are more readily attained by, for example, subdividing a properly orientated crystal-quartz slab of thickness equal to the thickness of the required members, instead of by subdividing a block as in FIGURE 1.) As indicated in FIGURE 3, the two inner members 33 and 34 are identical one with another as are also the two outer members 31 and 32.

Polarities have been assigned to each member shown in FIGURE 3 by designating a +X, −X, +Y, −Y, +Z, and −Z face on each member in accordance with the sense of the crystal axis normal or most nearly normal to the face. Thus, since FIGURE 3 shows the members as cut from block 11 of FIGURE 2 without rearrangement, the visible (lefthand) end faces are +Y faces, the hidden (righthand) end faces are −Y faces, the visible (upper) major side faces are +X faces, the hidden (lower) major side faces are −X faces, the visible (front) minor side faces are +Z faces and the hidden (rear) minor side faces are −Z faces.

Figure 4:
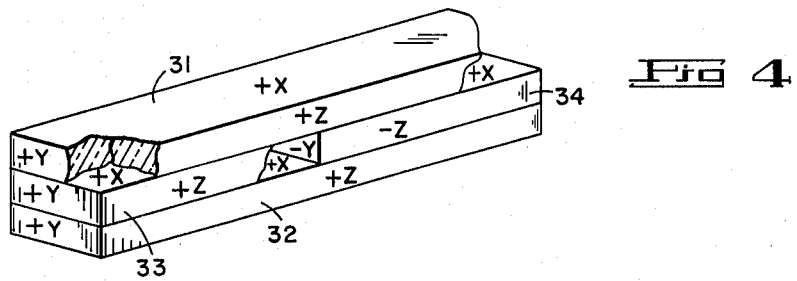
FIGURE 4 is a perspective view with parts broken away showing recombination of the members of FIGURE 3, in accordance with the present invention, the inner members being opposed in Y and Z polarities.

Attention is now directed to FIGURE 4 which shows the members 31–34 of FIGURE 3 recombined into a single structure in accordance with the present invention. In the multiple-member structure of FIGURE 4, it will be noted that the outer members 31 and 32 have the same polarity but that the inner members 33 and 34 are of opposed polarities with respect to the Y and Z axes.

Figure 5:
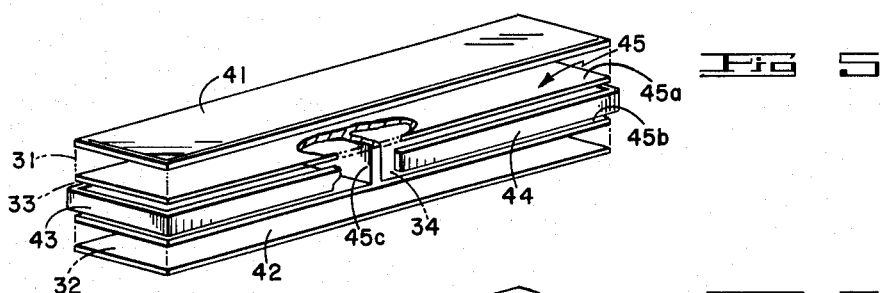
FIGURE 5 is a perspective view of a typical arrangement of electrodes on the members of the structure of FIGURE 4; the members are shown in phantom with parts broken away for purposes of clarity.

Attention is now directed to FIGURE 5 which shows members 31–34 bonded together into a single structure by a metal bond which serves also as part of electrode 45. In the figure, members 31–34 are in phantom to show more clearly the disposition of the electrodes. As may be seen from FIGURE 5, electrode 41 is disposed on the upper major side surface of member 31, electrode 42 is disposed on the lower major side surface of member 32, and electrodes 43 and 44 are disposed on, respectively, both minor side faces and both end faces of members 33 and 34. Electrode 45 is comprised of a first portion 45a disposed between the abutting surfaces of member 31 and members 33 and 34, a second portion 45b disposed between the abutting surfaces of member 32 and members 33 and 34, and a third portion 45c disposed between the abutting surfaces of members 33 and 34. The electrodes 41–45 of FIGURE 5 serve respectively the same electrical functions as electrodes 21–25 of FIGURE 2. Accordingly, by means of electrodes 41 and 42, the structure may be sustained in longitudinal resonance and by means of electrodes 43 and 44, the shear vibrational movements directed in the thickness direction, induced by rotation of the structure about an axis along the width direction, may be detected. Electrode 45 bonds the members together, provides a ground reference, and electrically isolates electrodes 41 and 42 from electrodes 43 and 44.

As used in the claims generic to both monolithic and multiple-member devices and claims specific to multiple-member devices, "electrode means disposed on at least one surface" includes electrode means disposed on at least one interior surface. As is well known by those skilled in the art, electrode means serving different purposes may be disposed on the same surface of a piezoelectric device. Accordingly, an electrode or electrodes for sustaining longitudinal resonance and an electrode or electrodes responsive to vibrational movements induced by rotation of a device in accordance with the present invention may also be disposed on the same and not necessarily different surfaces.

The opposed polarity of the inner members 33 and 34 with respect to the Y axis provides that the spurious voltages at electrodes 43 and 44, due to X axis orientation error in members 33 and 34, substantially cancel at an appropriate connection to the electronic circuitry, without need for additional compensating means. (X-axis orientation error in the two outer members 31 and 32 has negligible effects on electrodes 43 and 44, since these electrodes are confined to the inner members and are electrically isolated from members 31 and 32 by electrode 45.) The effectiveness of the spurious-cancelling effect of the Y-axis polarity reversal of the inner members is reduced if electrodes 43 and 44 are not of identical configuration and disposition; however, this deficiency can be overcome by further polarity rearrangement of the inner members, now to be described.

Figure 6:
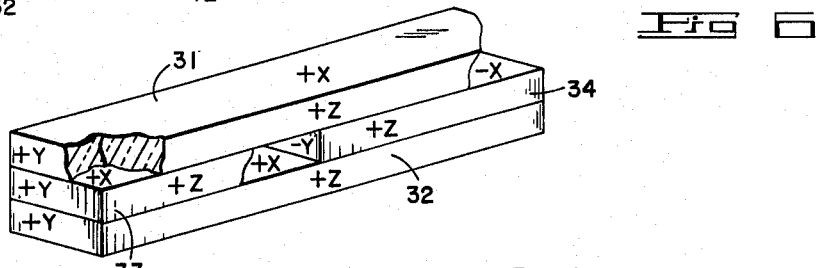
FIGURE 6 is a perspective view with parts broken away showing a different polarity arrangement of the members of FIGURE 3 wherein the inner members are opposed in X and Y polarities.

Attention is now directed to FIGURE 6 which shows a structure essentially the same as shown in FIGURE 4, except that the inner members 33 and 34 are opposed with respect to the Y and X polarities, instead of with respect to the Y and Z polarities. Thus, as shown in FIGURE 6, members 31, 32, and 33 have the same relative polarities as members 31, 32, and 33 of FIGURE 4, whereas member 34 of FIGURE 6 has reversed X and Z polarities as compared to member 34 of FIGURE 4.

Figure 7:
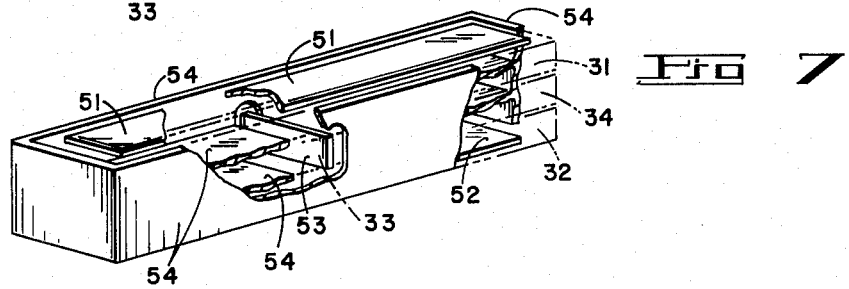
FIGURE 7 is a perspective view showing a typical electrode arrangement on the members of the block of FIGURE 6; the members are shown in phantom with parts broken away for purposes of clarity.
Figure 5:
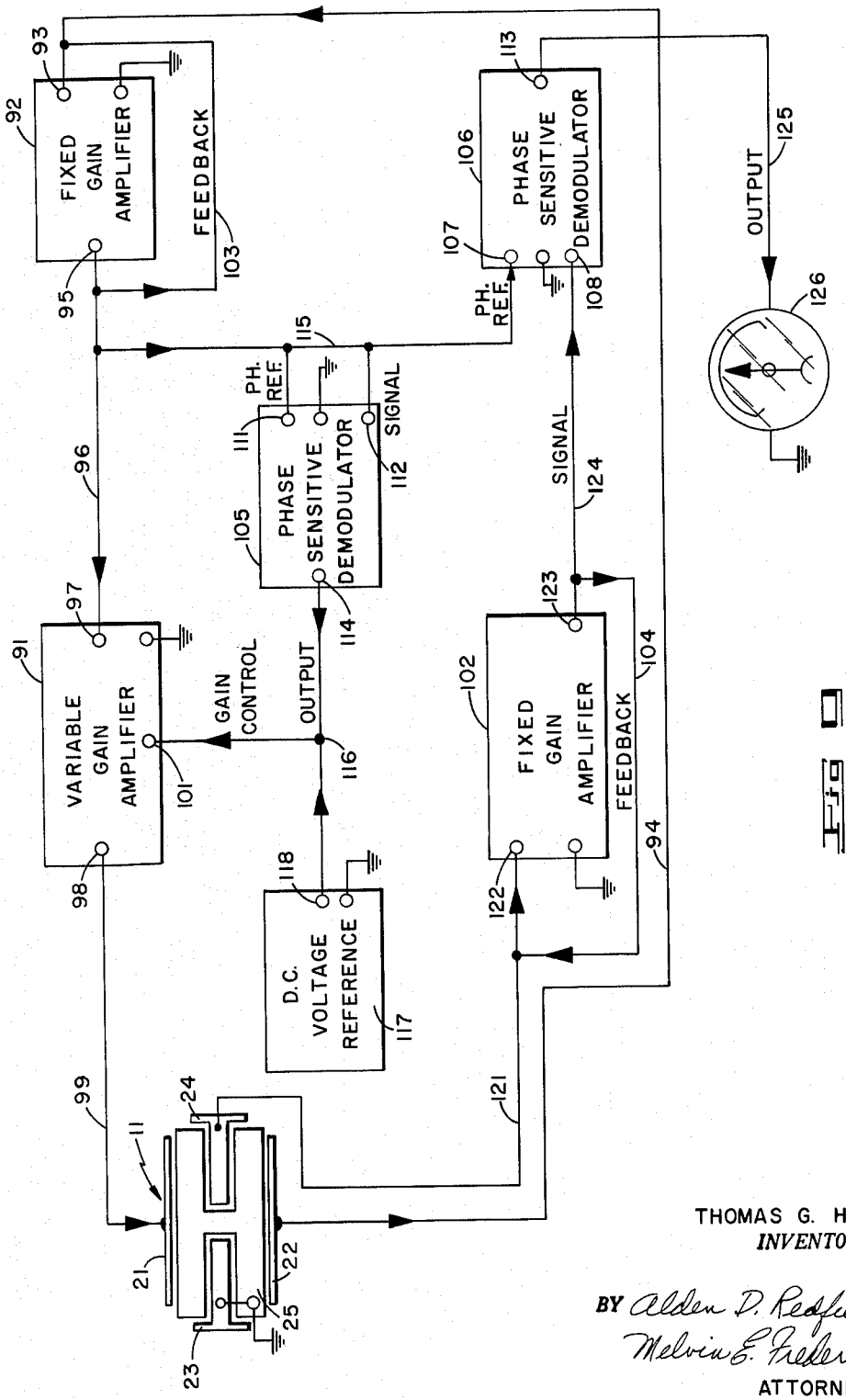

FIGURE 7 shows members 31–34 of FIGURE 6 bonded into a single structure by a metal bond which serves also as electrode 53 and part of electrode 54. Identical electrodes 51 and 52 are the counterparts of electrodes 21 and 22 of FIGURE 2 and, as shown in FIGURE 7, are disposed on, respectively, the upper major side face of member 31 and the lower major side face of member 32. Electrode 53 is, in conjunction with separate ground electrode 54, the counterpart of electrodes 43 and 44 and is disposed between the abutting end faces of the two inner members 33 and 34. Electrode 54 is the counterpart of electrode 45 and is disposed on and covers the end faces and side faces of members 31–34, with the exception of the areas occupied by and immediately adjacent to electrodes 51, 52, and 53.

The X-axis polarity reversal of member 34 provides that a net voltage is produced at electrode 53 by shear vibrational movements directed in the thickness direction. Precision in the configuration and disposition of electrode 53 is not required, since, whatever its configuration and disposition, it serves members 32 and 33 equally. The only source of electrode-inaccuracy-caused spurious voltage is therefore inaccuracy in the configuration and disposition of electrode 54, but because electrode 54 almost completely envelops electrode 53, the effect of such inaccuracy is small. As heitherto, in the case of the structure of FIGURE 5, the Y-axis polarity reversal of member 34 causes self-cancelling of the spurious voltages, due to X-axis orientation error.

It will, of course, be understood that the electrode configurations of FIGURES 2, 5, and 7 are typical and are given by way of example only. As is well known by those skilled in the art, electrical energy may generally be coupled into and out of a piezoelectric resonance device by a wide variety of electrode configurations and dispositions. For a particular device, serving a particular purpose, for example, rotation sensing, the choice of electrode configuration and disposition is broad enough that ease of fabrication, ease of connection, and convenience in matching the characteristics of associated electronic circuitry need to be considered in order to resolve relative merits of one electrode scheme versus another. Where two distinct electrode means are involved, for example, in the present invention, one means for sustaining vibrational resonance and the other means for detecting rotation, the choice of configuration and disposition is somewhat narrower than when only one electrode means is involved, as for example in a frequency-control device. However, the choice of configuration and disposition is still fairly broad, especially if the device is of multiple-member construction. Accordingly, it will be understood that, in general, given a particular piezoelectric structure having piezoelectric properties appropriate to rotation sensing as disclosed herein, those skilled in the art can detail a large number of suitable electrode means, for each of the modes of vibrational resonance of the structure, usable for rotation-sensing purposes in accordance with the present invention. Further, it will be understood that if such a piezoelectric structure is of anisotropic material (for example, crystal quartz) and has therefore complex cross-related mechanical and piezoelectric responses, it will generally not be meaningful to ascribe to the present invention any particular one of the wide variety of possible electrode configurations and dispositions that are available because particular or specific electrode configurations and dispositions depend upon the particular dimensions, orientation, type and mode of vibrational resonance, and, additionally in the case of a multiple-member device, relative orientations and polarities of the members that are selected in accordance with the present invention.

It will now be clear that multiple-member piezoelectric structures may have certain advantages over monolithic piezoelectric structures for purpose of rotation sensing. The techniques for precisely fabricating and furnishing with electrodes such multiple-member rectangular-prismatic structures are the same conventional and well-known techniques as for precisely fabricating and furnishing with electrodes monolithic blocks, but with the additional technique required for bonding individual members together into a single structure.

A successfully used method of bonding individual members together into a single structure is an extension of the technique for furnishing firmly bonded electrodes on surfaces and comprises vacuum evaporating consecutive layers of suitable different metals, one on top of the other, onto the surfaces to be abutted; clamping the metallized surfaces firmly together and then applying heat sufficient to fuse the metal layers into a single alloy metal bond. For example, consecutive layers of chromium, gold, and indium, each of thickness between one- and two-millionths of an inch, form, when heated to about 500° C., a high-strength alloy firmly bonded to the surfaces. In order that the extremely thin metal bond may be disposed uniformly without voids between the abutting surfaces, the surfaces must be flat within a few millionths of an inch. Such precisely flat surfaces are also desirable on monolithic rotation-sensing structures, as is also precise parallelism of opposing surfaces; the techniques for producing such precise flatness and parallelism are widely practiced and well known in the art, relying mainly upon abrasive lapping methods.

The means by which resonance structures, such as heretofore described, are mounted into an enclosure will, of course, have a significant effect upon their performance as rotation-sensors. Generally speaking, any type of mounting whatsoever will modify their resonance characteristics to some extent. For example, a compliant mounting will extract and convert into heat some of their resonance energy, and, hence, will introduce dissipative losses similar to internal frictional losses. On the other hand, for example, a noncompliant mounting will behave as rigid extension and will, therefore, modify their resonance characteristics in substantially nondissipative fashion. Hence, whereas compliant mounting will not substantially effect resonance frequencies, noncompliant mounting may have appreciable effect. In any case, whatever the type of mounting, the magnitude of its influence on resonance properties will depend upon the relative magnitude of the vibrational movement to which the mounting is subjected. A definite advantage is to be gained therefore by locating the mounting in a region where vibrational movements are at a minimum.

Commonly, in practice, a typical mounting is neither wholly compliant nor wholly noncompliant, being rather a compromise between the two and hence introduces both dissipative losses and some change in resonance frequencies. Further, location of a typical mounting is, of necessity, rarely confined to true nodal regions, since these regions are invariably strictly limited in size. Further, also, a typical mounting may require resistance to harsh environmental conditions, such as shock, vibration, and the like, to be achieved at some sacrifice of resonance characteristics.

From the above brief survey, it will be obvious that design of a mounting for a resonance structure will usually involve compromise among a large number of factors. It is not essential to the present invention that any particular mounting method be used, there being generally available a wide choice of adequate methods well known in the art. However, because of the importance of adequate mounting, particularly with respect to withstanding harsh environmental conditions, a typical mounting arrangement, serving equally any of the earlier disclosed, or similar, rectangular-prismatic devices, will now be described.

FIGURE 8 is an exploded view of a typical mounting arrangement for a rectangular-prismatic resonance device having a central nodal region, such as block 11 of FIGURE 2, operated in the fundamental-longitudinal mode. As shown in this figure, there is provided an inner mounting ring 61 composed of a stable insulating material, of suitable thermal expansion properties, such as crystal quartz in this particular case. The inner periphery 63 of ring 61, as shown in FIGURE 8, circumscribes and closely fits onto block 11. The chamfered outer periphery 62 of the inner mounting ring 61 fits tightly into matching slots 71 in a beryllium-copper intermediate mounting ring 72. The inner mounting ring 61 is bonded accurately at the center of the resonance block 11 by metal bonding techniques similar to those described earlier. It will be noted from FIGURE 8 that the four corners 73 of the intermediate mounting ring 72 fit into four corresponding grooves 74 in the inner surface of a ceramic mounting ring 75. Thus, the inner mounting ring 61, which is bonded to block 11, is secured by the intermediate mounting ring 72, which, in turn, is supported at its four corners 73 by the outer mounting ring 75. The outer mounting ring 75 has shoulders 76 fitting into flanged metallic end caps 81 and 82. Four metal pins 83 brazed into the outer mounting ring 75 are connected respectively to the four electrodes of block 11 by thin wires connected close to the center of the block (not shown for sake of clarity). The end caps 81 and 82 may be bonded to the outer ring 75 so as to form a hermetically sealed enclosure.

As has been pointed out, the block of FIGURE 2 and the structures of FIGURES 5 and 7 may be used, in substantially identical modes of operation, as single-axis rotation sensors, an alternating voltage being produced in response to rotations about appropriate axes, (a) Across detecting electrode pair 23 and 24 of the block of FIGURE 2;

(b) Across detecting electrode pair 43 and 44 of the structure of FIGURE 5;

(c) At the single detecting electrode 53 with respect to ground of the structure of FIGURE 7;

As, respectively, (a) The block of FIGURE 2 is sustained in longitudinal resonance via driving electrode pair 21 and 22;

(b) The structure of FIGURE 5 is sustained in longitudinal resonance via electrode pair 41 and 42; and (c) The structure of FIGURE 7 is sustained in longitudinal resonance via electrode pair 51 and 52.

In each case, the alternating voltage at the detecting electrodes (apart from a constant value spurious voltage component due to fabrication inaccuracies and independent of rotation) is of an amplitude proportional to rate of rotation and of a phase either leading or lagging the phase of the voltage at the driving electrodes, depending upon the sense of rotation. There is typically a 180° phase difference between the voltages due to the two senses of rotation . . . clockwise and anticlockwise. Accordingly, the block of FIGURE 2, the structures of FIGURES 5 and 7, and similar blocks and structures may, when suitably mounted, be used in conjunction with conventional electronic circuitry as single-axis rotation-sensors.

A typical electronic means, which is readily adaptable to use with the structures of FIGURES 2, 5 and 7 for measuring inertial rotation about a single axis, is shown by way of example in FIGURE 9 adapted to use with the block of FIGURE 2. For clarity, the resonance block of FIGURE 2 is illustrated schematically in FIGURE 9 as a skeleton of electrodes.

The block 11 is sustained in its fundamental longitudinal resonance by electrical energy supplied from a variable-gain amplifier 91, via electrode 21, the feedback loop being completed via electrode 22 through fixed gain amplifier 92 with electrode 25 serving as common ground. Accordingly, electrode 22 is connected to the input terminal 93 of fixed-gain amplifier 92 by conductor 94. The output terminal 95 of the fixed-gain amplifier 92 is connected by conductor 96 to the input terminal 97 of the variable-gain amplifier 91. Finally, the output terminal 98 of the variable-gain amplifier 91 is connected, via conductor 99, to electrode 21.

Variable-gain amplifier 91 is a conventional variable-gain A.C.-amplifier, the gain of which depends upon the level of a bias voltage applied to the amplifier. This gain-control feature is designated by a separate gain-control terminal 101.

Fixed-gain amplifier 92 is a conventional negative-feedback A.C.-amplifier; the negative feedback feature, which stabilizes gain to an extent determined by the amount of the feedback, is designated by feedback loop 103. (In practice, such feedback is commonly accomplished within the amplifier circuit network.)

The alternating voltage appearing at detector electrode 24 of block 11, due to rotation of the block, is amplified by fixed-gain amplifier 102 (of type identical to fixed-gain amplifier 92) and phase-sensed and rectified by demodulator 106. Accordingly, electrode 24 is connected via conductor 121 to the input terminal 122 of amplifier 102, the output terminal 123 thereof being connected via conductor 124 to the input terminal 108 of demodulator 106. The phase-reference terminal 107 of demodulator 106 is connected via conductors 115 and 96 to the output terminal 95 of the amplifier 92.

Demodulator 106 is a conventional phase-sensitive demodulator, the output of which depends upon the relative phase and amplitude of the two alternating voltage inputs. This phase-dependence of the output of demodulator 106 is indicated in FIGURE 9 by identifying terminal 107 as the "phase-reference" terminal and terminal 108 as the "signal" terminal. The output of demodulator 106 at output terminal 113 is a direct voltage of amplitude proportional to the ampltiude of the input voltage at terminal 108 and of positive or of negative polarity, depending upon whether the voltage at terminal 107 and the voltage at terminal 108 are in or out of phase.

The voltage at output terminal 113 of demodulator 106 is accurately related to rotation rate (despite wide changes in resonance characteristics of block 11, due, for example, to wide variation in temperature), provided the voltage at output electrode 22 of block 11 is maintained at constant amplitude. This is achieved by controlling the gain of amplifier 91 so as to maintain the ouput of amplifier 92 at a constant level. Accordingly, the output terminal 95 of amplifier 92 is connected, via conductors 96 and 115, to input terminal 112 of demodulator 105. The output terminal 114 of demodulator 105 (of type identical to demodulator 106) is connected, via conductor 116, to both input terminal 118 of direct voltage reference 117 and to gain-control terminal 101 of amplifier 91. Phase-reference terminal 11 of demodulator 105 is connected, via conductor 115, to the input terminal 112 of demodulator 105, thus, providing that the signal voltage at terminal 112 serves as its own phase-reference. As will be readily understood, since the direct voltage applied to gain-control terminal 101 will depend upon the amplitude and polarity of the difference between the demodulated output voltage of fixed-gain amplifier 92 and the voltage of direct voltage reference 118, the output of amplifier 92 will hence be maintained at constant level.

For certain purposes, it may be desirable to measure or display only the rate, and not the sense, of rotation.

With reference to FIGURE 9, such limited purpose may be achieved simply by omitting demodulator 106 and associated connections and feeding the output of amplifier 102 directly to an oscilloscope or the like (not shown). In the combination of FIGURE 9, both rate and sense of rotation are indicated by a center-zero dual-polarity direct voltmeter 126 connected via conductor 125 to terminal 113 of demodulator 106. Meter 126 is, of course, shown merely for illustrative purposes; generally speaking, the output signal from demodulator 106 may be used in all the ways that similar signals developed from conventional rate-gyroscopes are used; for example, as a stabilizing or error signal in a servo system.

In summary, with reference to FIGURE 9, it has been shown that a suitable piezoelectric structure suitably furnished with electrodes, such as block 11, will, in conjunction with suitable conventional electronic circuitry, serve either to measure either or both sense and rate of rotation or to provide an electrical signal of amplitude proportional to the rate of rotation and of phase indicative of the sense of rotation.

Devices in accordance with the present invention, when used for purposes of rotation-sensing, have numerous advantages over conventional spinning-rotor-type rate-gyroscopes. Stated briefly, these advantages are as follows:

(1) Having no rotating or sliding parts, they perform more consistently over a much longer life period than conventional rate-gyroscopes.

(2) Having, directly, an alternating output of narrow frequency band, noise is less of a limitation upon sensitivity than in conventional rate-gyroscopes. Hence, they have a higher figure of merit, wherein sensitivity is related to weight, size, complexity, and power consumption, than have conventional rate-gyroscopes.

(3) Having, unlike conventional gyroscopes, no output in response to linear acceleration, due to mass unbalance and anisoclasticity, they are affected less by linear acceleration.

(4) Having no gimbal movement, which movement unavoidably produces cross-axis response in conventional rate-gyroscopes, they have lower cross-axis sensitivity.

(5) Having a "zero-rotation-output" determined largely by stable parameters, their variation in "zero-rotation-output" is lower than that of conventional rate-gyroscopes.

(6) Having, for a given sensitivity, a lower stored energy than conventional rate-gyroscopes, they have a much shorter starting time than conventional rate-gyroscopes.

(7) Having, for a given sensitivity, lower frictional and electrical losses than conventional rate-gyroscopes, they have lower power consumption.

(8) Having no relatively delicate spring-restraining elements, which elements serve to allow limited gimbal movement in conventional rate-gyroscopes, they are more resistant to shock, vibration, and steady acceleration.

(9) Having, inherently, a broad-band response to changing rates of rotation, they do not require dissipative damping, as do conventional rate-gyroscopes, and, hence, have a much more consistent transfer function.

(10) Having, inherently, a low temperature coefficient of sensitivity, further reducible by electronic feedback methods, their performance has a lower variability with temperature than has the performance of conventional rate-gyroscopes.

(11) Having, preferably, the requirement for extreme mechanical precision confined to relatively easily attained flatness and parallelism lone, and not, additionlly, the more difficult to attain roundness and concentricity, as required in conventional rate-gyroscopes, they can be more consistently and economically fabricated.

(12) Having, inherently, much broader range characteristics than conventional rate-gyroscopes, they are more readily adapted to an extensive field of applications.

(13) Having, essentially, a simpler construction than conventional rate-gyroscopes, they have a higher figure of merit-relating performance to cost.

The following specification for typical device in accordance with the present invention, such as shown in FIGURE 8, in combination with suitable electronics, such as shown in FIGURE 9, are given by way of example of performance characteristics:

| | |
|---|---|
| Size | 1¼ inches diameter by 2 inches long. |
| Weight | 4 ounces. |
| Input | 27–29 volts D.C. |
| Output | D.C. voltage proportional to rate of rotation about a single axis, of polarity depending upon sense of rotation. |
| Power consumption | less than 1.0 watt. |
| Warm-up time | less than 1 second. |
| Temperature range | −55° C. to 125° C. |
| Maximum linear acceleration | 400 gravities. |
| Vibration, 30 to 2,000 c.p.s. | 40 gravities peak. |
| Operating life | greater than 50,000 hours. |
| Total sensitivity range (crystal element) | 0.01°/sec. to 1,000/sec. |
| Partial sensitivity range (output electronics) | 10,000 to 1 anywhere within total range (resolution .01% of full scale). |
| Zero-set including hysteresis | 0.05% of full scale. |
| Full-scale output | 5 volts across 10,000 ohms. |
| Frequency response | less than 1° phase-shift and 1% amplitude change from 0 to 100 c.p.s. sinusoidal input (transfer function is essentially independent of input frequency and temperature). |
| Sensitivity variation with temperature | less than .01%/° C. from −55° C. to 100° C. |
| Linearity | 0.5% over full-scale range. |
| Acceleration sensitivity | 0.005% of maximum angular output per gravity. |
| Cross-axis coupling | less than 0.1%. |

The various features and advantages of the invention disclosed are thought to be clear from the foregoing description. Various other features and advantages not specifically enumerated will undoubtedly occur to those versed in the art as likewise will many variations and modifcations of the embodiments of the invention illustrated herein, all of which may be achieved without departing from the spirit and scope of the invention as defined in the following claims:

What is claimed is:

1. Transducer apparatus having, in combination,
 (a) a prismatic piezoelectric medium adapted to support first resonant vibrations;
 (b) means on at least one surface of said medium for setting up and sustaining said first resonant vibrations in the medium, said first resonant vibration having at least a component along a first direction;
 (c) means for supporting said medium to permit rotation of the same about an axis extending along a second direction orthogonal to the first direction to produce second resonant vibrations along a third direction orthogonal to the first and second directions, said second resonant vibrations resulting from the resonant vibration along the first direction and the angular velocity about said axis; and (d) sensing means disposed on at least one surface of said medium for detecting said second resonant vibrations.

2. In a transducer apparatus as described in claim 1 wherein said prismatic piezoelectric medium is rectangular.

3. In a transducer apparatus as described in claim 1 in which said prismatic piezoelectric device is made of crystal quartz and is of rectangular configuration.

4. In a transducer apparatus as described in claim 3 wherein said first vibrational resonance is a longitudinal vibrational resonance.

5. In a transducer apparatus as described in claim 3 wherein said first vibrational resonance is a flexural vibrational resonance.

6. In a transducer apparatus as described in claim 3 wherein said first vibrational resonance is a shear vibrational resonance.

7. In a rotation sensor, the combination comprising:

(a) a rectangular prismatic piezoelectric device responsive to stresses directed respectively in a first and a third substantially mutually orthogonal direction and having a vibrational resonance wherein vibrational movements are directed in said first direction;

(b) first electrode means disposed on at least one surface of said device for setting up and sustaining said vibrational movements in said first direction;

(c) means for supporting said device to permit rotation of the same about an axis extending along a second direction orthogonal to said first and third directions to produce second resonant vibrations along the third direction, said second resonant vibrations resulting from the resonant vibration along the first direction and the angular velocity about said axis; and (d) second electrode means disposed on at least one surface of said device for detecting said second resonant vibrations wherein said detected second resonant vibrations result substantially only from varying stresses acting within said device and directed in said third direction.

8. In a rotation sensor as described in claim 7 wherein said piezoelectric device is a piezoelectric polycrystalline solid.

9. In a rotation sensor as described in claim 7 wherein said piezoelectric device is a piezoelectric crystalline solid.

10. In a rotation sensor as described in claim 7 wherein said piezoelectric device is a crystal quartz solid.

11. The combination as defined in claim 10 wherein said crystal quartz rectangular-prismatic device is orientated with respect to its crystal axes to render said rotation sensor piezoelectrically responsive independently and conjointly to stresses directed respectively in said first and third mutually orthogonal directions.

12. The combination as defined in claim 11 wherein said crystal quartz rectangular-prismatic medium is a monolithic block.

13. The combination as defined in claim 1 wherein said prismatic piezoelectric device comprises a plurality of crystal quartz prismatic members bonded together to form a prismatic device, said members being orientated with respect to the crystal axes to render said device piezoelectrically responsive independently and conjointly to stresses directed respectively in said first and third substantially mutually orthogonal directions.

14. The combination as defined in claim 13 wherein said members and said device are rectangular-prismatic, said members are of substantially identical orientation with respect to the crystal axes, two of said members are of opposed polarity with respect to at least one of the crystal axes, and said second electrode means includes a metallic layer bonding two of said members at abutting surfaces.

References Cited by the Examiner

UNITED STATES PATENTS 2,830,274   4/1958   Rosen et al.  ---------- 310—9.8
2,948,867   8/1960   Mattiat  -------------- 310—9.8

MILTON O. HIRSHFIELD, *Primary Examiner.*

ORIS L. RADER, *Examiner.*

A. J. ROSSI, *Assistant Examiner.*